(12) United States Patent
Michel

(10) Patent No.: US 11,208,073 B2
(45) Date of Patent: Dec. 28, 2021

(54) VEHICLE HAVING AN ACCESS MANAGEMENT SYSTEM AND METHOD FOR AUTHORIZING ACCESS TO A VEHICLE

(71) Applicant: PSA AUTOMOBILES SA, Poissy (FR)

(72) Inventor: Stephane Michel, Foussemagne (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 16/971,192

(22) PCT Filed: Jan. 25, 2019

(86) PCT No.: PCT/FR2019/050161
§ 371 (c)(1),
(2) Date: Aug. 19, 2020

(87) PCT Pub. No.: WO2019/162585
PCT Pub. Date: Aug. 29, 2019

(65) Prior Publication Data
US 2021/0094510 A1     Apr. 1, 2021

(30) Foreign Application Priority Data

Feb. 21, 2018  (FR) ...................................... 1851455

(51) Int. Cl.
*B60R 25/24* (2013.01)
*B60Q 1/50* (2006.01)
(52) U.S. Cl.
CPC .............. *B60R 25/245* (2013.01); *B60Q 1/50* (2013.01); *B60Q 2400/40* (2013.01)

(58) Field of Classification Search
None
See application file for complete search history.

(56) References Cited

U.S. PATENT DOCUMENTS

| 5,406,171 A  * | 4/1995 | Moody ................... | B60Q 9/00 307/10.8 |
| 7,091,842 B2 * | 8/2006 | Koncelik, Jr. ........... | B60Q 9/00 340/456 |

(Continued)

FOREIGN PATENT DOCUMENTS

| DE | 10064141 A1 | 7/2002 |
| EP | 0629758 A1 | 12/1994 |
| JP | 2013087450 A  * | 5/2013 |

OTHER PUBLICATIONS

International Search Report for PCT/FR2019/050161 dated Apr. 18, 2019.
Written Opinion for PCT/FR2019/050161 dated Apr. 18, 2019.

*Primary Examiner* — Muhammad Adnan
(74) *Attorney, Agent, or Firm* — Sandberg Phoenix & von Gontard, P.C.

(57) ABSTRACT

The invention relates to a motor vehicle having an access management system for managing access to the vehicle, the access management system being configured so as to detect the presence of an identifier, such as an electronic key or a mobile telephone, close to the vehicle and to activate a courtesy light when the identifier is detected within a first zone, called courtesy zone, the access management system comprising a counter whose count value is incremented by a unit upon each activation of the courtesy light, the activation of the courtesy light no longer being possible if the count value reaches a predetermined value.

13 Claims, 1 Drawing Sheet

(56) References Cited

U.S. PATENT DOCUMENTS

| | | | |
|---|---|---|---|
| 8,000,842 B2* | 8/2011 | Yi | H04L 67/12 |
| | | | 701/1 |
| 9,323,313 B2* | 4/2016 | Osuga | G06F 1/3234 |
| 9,758,088 B1* | 9/2017 | Salter | B60Q 1/2611 |
| 2007/0030136 A1 | 2/2007 | Teshima et al. | |
| 2007/0200672 A1* | 8/2007 | McBride | B60R 25/245 |
| | | | 340/5.72 |
| 2009/0119528 A1* | 5/2009 | Yang | G06F 1/3203 |
| | | | 713/323 |
| 2012/0092129 A1* | 4/2012 | Lickfelt | B60R 25/24 |
| | | | 340/5.72 |
| 2012/0158244 A1* | 6/2012 | Talty | B60R 25/24 |
| | | | 701/36 |
| 2015/0161834 A1* | 6/2015 | Spahl | G07C 9/00309 |
| | | | 340/5.61 |
| 2015/0274126 A1 | 10/2015 | Nishiyama | |
| 2015/0332578 A1* | 11/2015 | Borgne | B60N 2/002 |
| | | | 340/667 |
| 2016/0129880 A1* | 5/2016 | Cuddihy | B60R 22/03 |
| | | | 340/457.1 |
| 2017/0294801 A1* | 10/2017 | Kim | B60L 53/00 |
| 2017/0309098 A1* | 10/2017 | Watters | H04W 4/025 |
| 2018/0151009 A1* | 5/2018 | Kim | E05B 81/78 |
| 2018/0154823 A1* | 6/2018 | Salter | B60Q 1/32 |
| 2020/0062183 A1* | 2/2020 | Smith | B60R 16/03 |

* cited by examiner

VEHICLE HAVING AN ACCESS MANAGEMENT SYSTEM AND METHOD FOR AUTHORIZING ACCESS TO A VEHICLE

CROSS-REFERENCE TO RELATED APPLICATIONS

This application is the US National Stage under 35 USC § 371 of International Application No. PCT/FR2019/050161, filed 25 Jan. 2019 which claims priority to French Application No. 1851455 filed 21 Feb. 2018, both of which are incorporated herein by reference.

BACKGROUND

The invention relates to the field of managing access to a motor vehicle. More specifically, the invention relates to an automatic access and starting system for a motor vehicle as well as a method for authorizing access to a motor vehicle.

Motor vehicles comprising an access and starting system without manual intervention, commonly called "hands-free access and starting" are known in the field. Such a system makes it possible to unlock the doors and/or other anti-theft security devices of the motor vehicle, without manual intervention by the user. For this purpose, the user is provided with an identifier, such as a key or an electronic card, commonly called "hands-free identifier." The hands-free identifier allows a control unit for unlocking the motor vehicle to recognize the authorized user when the user is near a door of the motor vehicle, when the user actuates the opening handle, or when the user uses any other device for opening the door from the exterior of the vehicle.

The identifier can for example be formed by an electronic card or a transmitter supplying an identification code that must be recognized by the unlocking control unit of the motor vehicle to allow the unlocking maneuver.

Generally, the automatic access and starting system comprises means for detecting the hands-free identifier when it is within a predetermined zone inside the passenger compartment of the motor vehicle, or in any of several predetermined zones at least partially surrounding the outside of the motor vehicle. For example, the hands-free identifier can be detected when in the vicinity of the vehicle doors, or in the vicinity of the rear part of the vehicle. Thus, the automatic access and starting system is able to recognize an identifier when its bearer approaches and unlocks the vehicle.

Functions other than unlocking can also be implemented, such as starting the vehicle, adjusting customized settings (height and position of the driver's seat, etc.), turning on the headlights, or turning on one or more of the lights that form a "courtesy light."

The courtesy light can be activated prior to or at the same time as the unlocking of the vehicle. When the bearer of an authorized identifier is approaching, the courtesy light is activated as soon as an identifier (and therefore its bearer) is detected entering a predetermined zone (virtually) delimited around the vehicle. Thus, each time the bearer of the identifier enters this zone, the courtesy light is activated. However, the courtesy light consumes energy, which can generate a risk of discharge of the battery in certain situations, in particular, if a user enters the courtesy zone a certain number of times, or enters the vehicle itself, but without starting the vehicle.

SUMMARY

The object of the present invention is to address the drawbacks of the state of the art, and more particularly to address those described above, by proposing a hands-free access and start-up system that implements a courtesy light that makes it possible to preserve the vehicle battery charge.

To that end, the invention relates to a motor vehicle comprising a vehicle access management system, the access management system being configured to detect the presence of an identifier, such as an electronic key or a mobile telephone that is close to the vehicle. The access management system activates a courtesy light when the identifier is detected within a first zone, called a courtesy zone. The access management system further comprises a counter whose count value is incremented by a unit each time the courtesy light is activated. When the counter reaches a predetermined value, the activation of the courtesy light is no longer possible.

Thus, by allowing the courtesy light function to be inhibited after a certain number of consecutive illuminations of the courtesy light without the vehicle engine having been started (or, alternatively, without it having operated for a minimum length of time), the access management system saves the vehicle battery, and thus ensures that it retains a sufficient level of charge for a subsequent engine start. The access management system also has the advantage of being simple and inexpensive to implement.

In one embodiment, the count value of the counter is reset each time the engine is started.

In one embodiment, the count value of the counter is reset if, after starting, the engine operating time reaches a predetermined minimum duration.

In one embodiment, the predetermined value is between 3 and 12, preferably between 5 and 10, and for example equal to 7.

In one embodiment, the access management system is configured to unlock the vehicle if the identifier is detected within a second zone encompassing the vehicle, called unlocking zone.

In one embodiment, the unlocking zone is more restricted than the courtesy zone.

In one embodiment, the access management system is configured to lock the vehicle if the identifier is detected as having left a third zone encompassing the vehicle, called locking zone.

In one embodiment, the locking zone is more restricted than the courtesy zone and/or more extensive than the unlocking zone.

In one embodiment, the access management system comprises a wireless communication module, and a plurality of antennas that are distant from one another and remote from the communication module.

In one embodiment, the access management system comprises at least four antennas.

In one embodiment, at least two antennas are side antennas, arranged on either side of the longitudinal axis of the vehicle, for example in the side doors of the vehicle.

The invention also relates to a method for authorizing access to a motor vehicle, the method comprising the following steps:
   activating a courtesy light function when an identifier is detected as being located within a first zone encompassing the vehicle, called courtesy zone;
   incrementing the count value of a counter by one each time the courtesy light function is activated;
   inhibiting the vehicle courtesy light function when the count value of the counter reaches a predetermined value.

In one embodiment, the count value of the counter is reset each time the engine is started.

In one embodiment, the count value of the counter is reset if, after starting, the engine operating time reaches a predetermined minimum duration.

In one embodiment, the predetermined value is between 3 and 12, preferably between 5 and 10, and for example equal to 7.

In one embodiment, the method includes the step of unlocking the vehicle if the identifier is detected within a second zone encompassing the vehicle, called unlocking zone.

In one embodiment, the unlocking zone is more restricted than the courtesy zone.

In one embodiment, the method comprises the step of locking the vehicle if the identifier is detected as having left a third zone encompassing the vehicle, called locking zone.

In one embodiment, the locking zone is more restricted than the courtesy zone and/or more extensive than the unlocking zone.

DESCRIPTION OF THE FIGURES

The present invention will be better understood upon reading the following detailed description with reference to the appended drawings.

DETAILED DESCRIPTION

Figure 1:
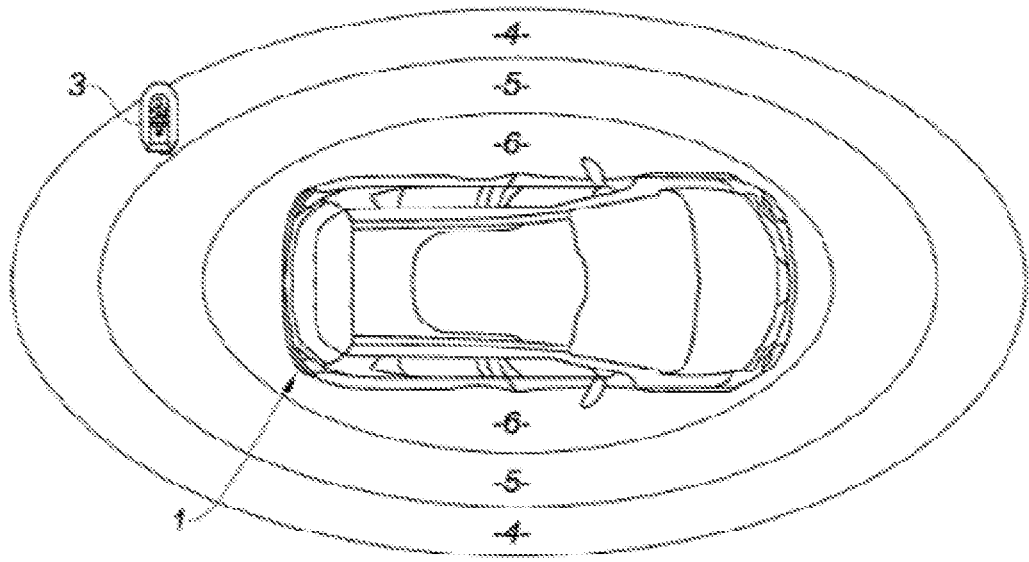
FIGS. 1 and 2 show a vehicle comprising an automatic access and starting system according to the invention.
Figure 2:
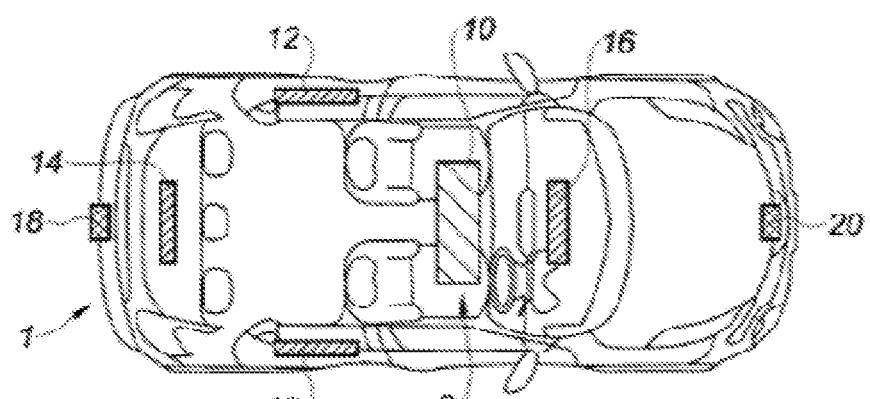

FIGS. 1 and 2 show a motor vehicle 1, the vehicle 1 equipped with an automatic access and starting system, or access management system 2. The access management system 2 is configured to detect an identifier 3 located near the vehicle 1. The identifier 3 is a portable electronic device, such as an electronic key, an electronic card, a mobile telephone, etc. The access management system 2 is configured to determine the distance and/or the position of the identifier 3 relative to the vehicle 1. More specifically, the access management system is able to determine whether the identifier 3 (and therefore its bearer) is located within a first zone encompassing the vehicle, called courtesy zone 4. The edge of the courtesy zone 4, for example, is of a generally elliptical shape that is for example at a distance from the vehicle of between 2 and 4 meters, and in particular equal to approximately 3 meters.

When the access management system 2 detects the presence of an authorized identifier within the courtesy zone 4, the courtesy light is then activated. This activation notably involves the illumination of the headlights of the vehicle 1 and of various auxiliary lights, such as lights that make it possible to illuminate the ground near the doors of the vehicle.

The access management system 2 comprises a counter, the count value of which is incremented by one unit each time the courtesy light is activated. When the count value of the counter reaches a predetermined value, for example equal to 7, the courtesy light function is inhibited: the courtesy light can no longer be activated until the count value has been reset. By inhibiting the courtesy light function after a predetermined number of consecutive activations of the courtesy light without starting the vehicle (and therefore without at least partial recharging of the vehicle battery via the alternator driven by the engine), a sufficient charge level of the battery for a subsequent start-up can be maintained.

The count value of the counter can be reset each time the engine is started. Alternatively, this reset can occur if, after starting the engine, it operates for a length of time greater than or equal to a predetermined duration.

The access management system 2 comprises a wireless communication module 10, capable of exchanging data via a wireless link with a portable electronic device such as an electronic key, an electronic card, a mobile telephone (in particular of the "smartphone" type), such as the electronic key 3 shown in FIG. 1.

The access management system 2 comprises a plurality of antennas arranged in different areas of the vehicle 1. Advantageously, as shown in FIG. 2, the vehicle comprises at least four antennas that are offset relative to the communication module 10: two side antennas 12 (arranged on each side of the vehicle, for example in a side door), a rear antenna 14 (for example arranged near the rear window), and a front antenna 16 (for example arranged near the windshield). This set of four antennas can advantageously be supplemented by one or more additional antennas, for example two additional antennas 18, 20 respectively arranged in the rear and front bumpers.

With reference to the figures, the set of remote antennas described above is of the low frequency type, and each antenna is capable of transmitting a low-frequency signal specific to it at regular intervals. When this signal is picked up by a hands-free identifier, such as the identifier 3, the identifier in return transmits a high-frequency signal that the communication module 10 can receive by means of an internal high-frequency antenna. The signal received from the identifier allows the access management system to recognize the identifier 3 as being authorized and to determine that it is near the vehicle, and more precisely what the position of the identifier 3 is, depending on the remote antenna to which the identifier is closest.

The access management system 2 thus is able to detect any entry of the identifier 3 (and therefore of its bearer) within the courtesy zone 4 and, in response to this detection, to command the activation of courtesy light.

Advantageously, one or more specific zone(s) may be provided in addition to the courtesy zone 4. For example, as can be seen in FIG. 1, two zones may be provided that are more restricted than the courtesy zone 4 and that also encompass the vehicle 1. The most restricted zone is an unlocking zone 6, in which the detection of the identifier 3 results in the unlocking of the vehicle. The edge of the unlocking zone 6, which in the example is of a generally elliptical shape and is for example at a distance from the vehicle of between 0.5 and 1.5 meters. The intermediate zone, which in the example is more restricted than the courtesy zone 4 but more extensive than the unlocking zone 6, constitutes a locking zone 5. The detection of the identifier 3 leaving the locking zone 5 while the vehicle is unlocked (for example after the vehicle has stopped or after the identifier 3 has been detected in the unlocking zone 6) results in the access management system 2 commanding the locking of the vehicle. The edge of the locking zone 5, which in the example is of generally elliptical shape and is for example located at a distance from the vehicle of between 1.5 and 2.5 meters.

The invention claimed is:

1. A motor vehicle comprising an engine, a courtesy light, and a vehicle access management system, the access management system being configured to detect the presence of an identifier close to the vehicle, and to activate the courtesy light when the identifier is detected within a first zone, the access management system comprising a counter whose count value is incremented by a unit upon each activation of the courtesy light, the access management system being configured:
- to prohibit activation of the courtesy light if the count value reaches a predetermined value without the engine having been started, and
- to reset the count value of the counter either upon starting of the engine or upon the engine operating for a predetermined period of time.

2. The vehicle according to claim 1, wherein the predetermined value is between 3 and 12.

3. The vehicle according to claim 1, wherein the access management system is configured to unlock the vehicle if the identifier is detected within a second zone encompassing the vehicle.

4. The vehicle of claim 3 wherein the second zone is more restrictive than the first zone.

5. The vehicle of claim 4 wherein the access management system is configured to lock the vehicle if the identifier is detected as having left a third zone encompassing the vehicle.

6. The vehicle of claim 5 wherein the third zone is more restricted than the second zone and/or more extensive than the first zone.

7. The vehicle according to claim 1, wherein the access management system is configured to lock the vehicle if the identifier is detected as having left a third zone encompassing the vehicle.

8. The vehicle according to claim 1 wherein the predetermined value is between 5 and 10.

9. The vehicle according to claim 1 wherein the predetermined value is equal to 7.

10. A method for authorizing access to a motor vehicle comprising an engine and a courtesy light, the method comprising the following steps:
- activating a courtesy light function of the courtesy light when an identifier is detected within a first zone encompassing the vehicle;
- incrementing the count value of a counter by one each time the courtesy light function is activated;
- prohibiting activation of the vehicle courtesy light function when the count value of the counter reaches a predetermined value without the engine having been restarted; and
- resetting the count value of the counter either upon starting of the engine or upon the engine operating for a predetermined period of time.

11. The method according to claim 10, wherein the predetermined value is between 3 and 12.

12. The method according to claim 10 wherein the predetermined value is between 5 and 10.

13. The method according to claim 10 wherein the predetermined value is equal to 7.

* * * * *